UNITED STATES PATENT OFFICE.

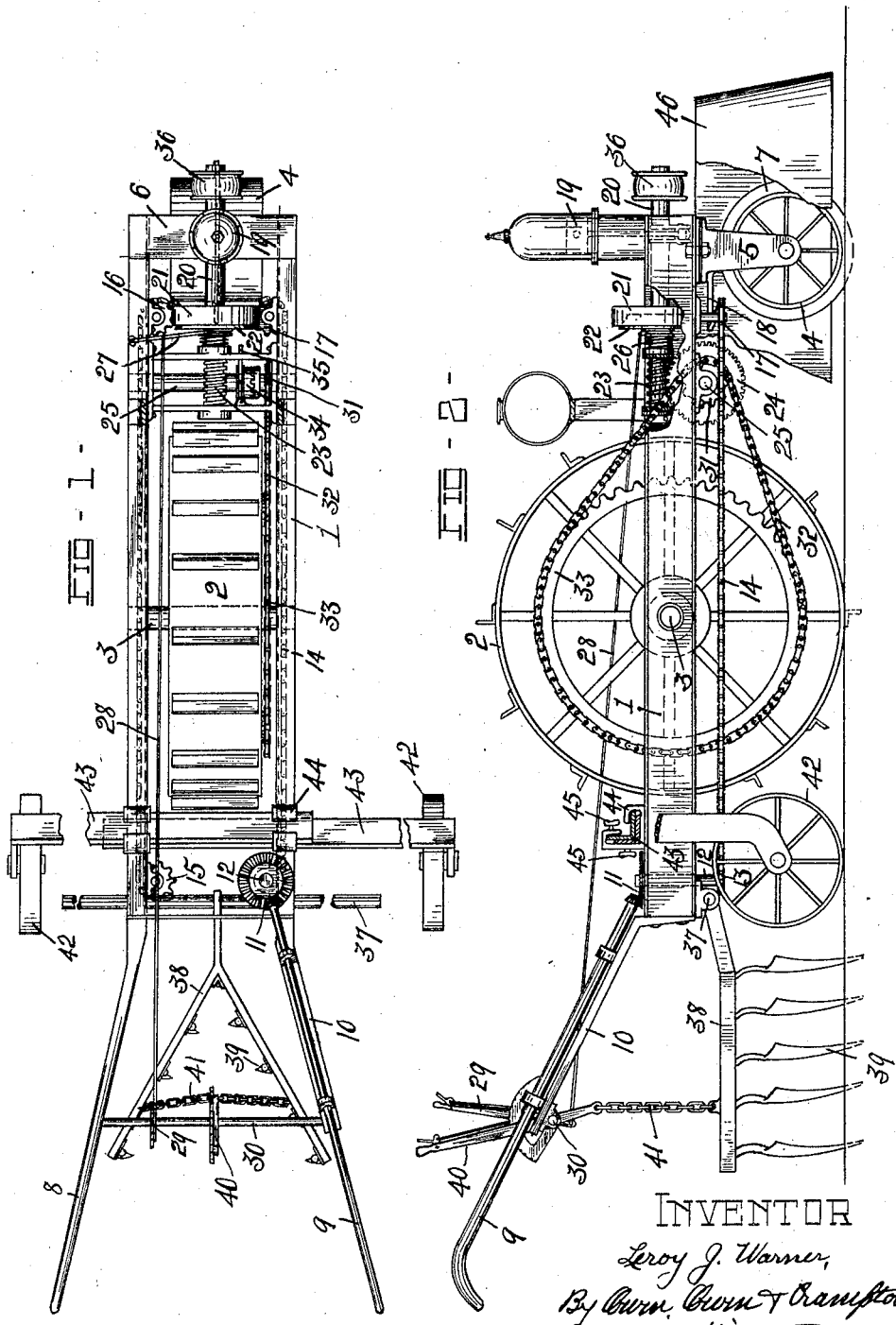

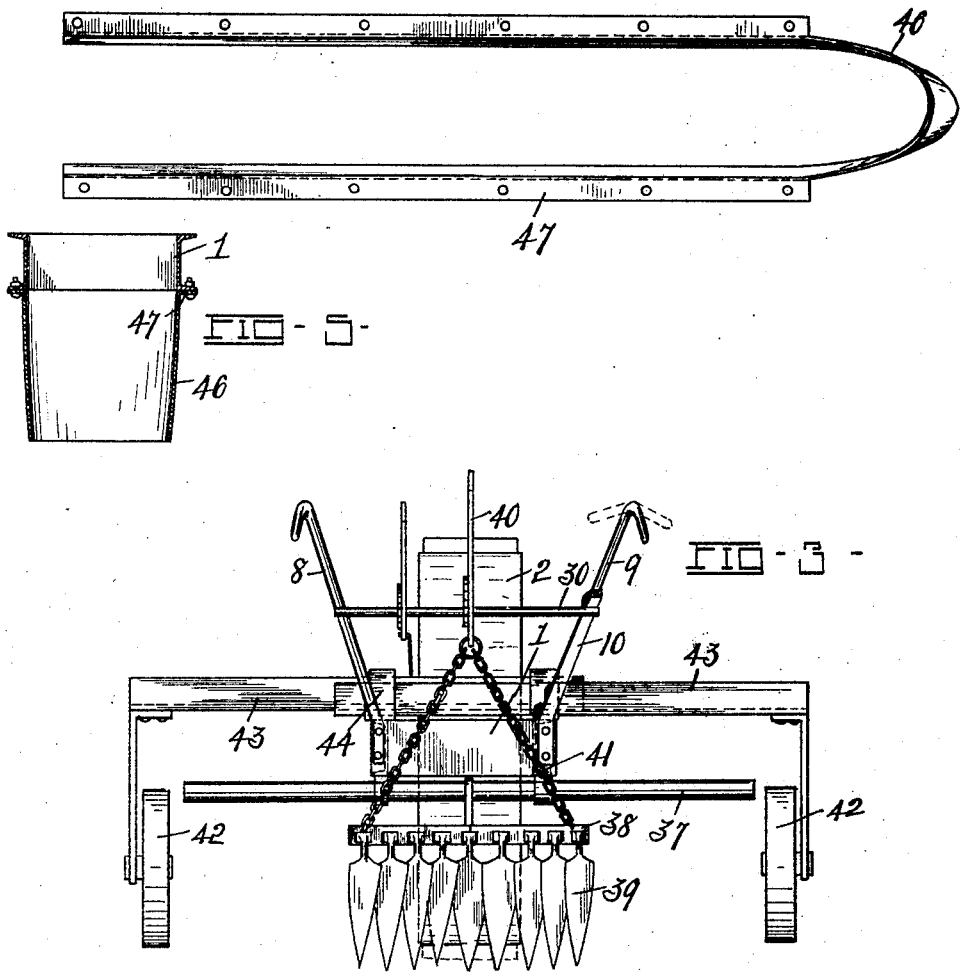

LEROY JOSEPH WARNER, OF TOLEDO, OHIO.

GARDEN-TRACTOR.

1,392,992. Specification of Letters Patent. Patented Oct. 11, 1921.

Application filed May 7, 1919. Serial No. 295,445.

*To all whom it may concern:*

Be it known that I, LEROY JOSEPH WARNER, a citizen of the United States, and a resident of Toledo, in the county of Lucas and State of Ohio, have invented a certain new and useful Garden-Tractor; and I do hereby declare the following to be a full, clear, and exact description of the invention, such as will enable others skilled in the art to which it appertains to make and use the same, reference being had to the accompanying drawings, and to the characters of reference marked thereon, which form a part of this specification.

This invention relates to garden tractors, and has for its primary object the provision of a simple improved and highly efficient device of this character which is narrow in form and provided with a single centrally located bull-wheel, thereby adapting it for use between rows of plants. A further object of the invention is the provision of a simple and efficient control means for the caster or steering wheel. A further object of the invention is the provision of a detachable guard apron for the machine which effects a spreading of the leaves and vines of vegetables or the like and prevents them from falling under the wheels as the machine traverses a row. Further objects and advantages of the invention will be apparent from the following detailed description thereof.

While the invention in its broader aspect is capable of embodiment in numerous forms, a preferred embodiment thereof is illustrated in the accompanying drawings, in which,—

Figure 1 is a plan view of an apparatus embodying the invention with parts broken away and with the guard apron removed. Fig. 2 is a side elevation of the apparatus with parts broken away. Fig. 3 is a rear end elevation thereof. Fig. 4 is a top plan view of the guard apron removed from the machine, and Fig. 5 is a cross-sectional view of the machine frame and apron attached thereto.

Referring to the drawings, 1 designates the tractor frame, which is of narrow rectangular form to adapt it to pass between rows of plants. This frame is supported by a single bull or tractor wheel 2, which is mounted between the frame sides on a cross shaft or axle 3 carrying the respective frame sides at its ends. The front end of the frame 1 is supported by a caster-wheel 4, the fork 5 of which is attached for horizontal turning movements to the under side of the front end bar 6 of the frame. This wheel alines with the bull wheel and preferably has its periphery of broad or drum form and provided circumferentially around its central portion with a flange 7, which assists in directing the course of the machine when turning and also tends to steady the machine against laterally swinging movements. The main weight of the machine is in advance of the bull wheel axle 3.

The frame is provided at its rear end with a pair of forwardly and rearwardly projecting control handles 8 and 9, the latter of which, in the present instance, is carried for rotary movements about its longitudinal axis by a bearing arm 10, projecting from the frame end. The forward end of the handle 9 has bevel-gear connection 11 with a short shaft 12 journaled vertically in the adjacent frame end, and this shaft is provided at its lower end with a sprocket wheel 13. An endless sprocket chain 14 extends around this sprocket wheel and three idler wheels 15, 16 and 17 and is connected between the wheels 16 and 17 to a steering arm 18 projecting rearwardly from the head portion of the caster wheel 5, so that a turning of the handle 9 will impart steering movement to the caster-wheel.

A motor 19, in the present instance, of the internal combustion type, is mounted on the forward end of the frame 1 and has its crank-shaft 20 extending lengthwise of the frame centrally thereof and provided at its rear end a short distance to the rear of the motor with a fixed friction clutch member 21. The other member 22 of this clutch is carried for axial shifting movements by a shaft section axially alined with the shaft 20 and having a worm 23 in mesh with a worm wheel 24 carried by a counter shaft 25 journaled at its ends in the frame sides. A coiled spring 26 on the worm shaft acts on the clutch member 22 to normally hold it engaged with its companion. A shift lever 27 is pivoted at its outer end to the frame 1 and has its inner end engaged to the clutch member 22. A draft member 28 extends rearwardly from the lever 27 to a control lever 29 fulcrumed on a shaft or bar 30 connecting the handle 8 and arm 10, so that a forward movement of the upper end of the control lever will impart a releasing movement to the clutch member 22.

The counter shaft 25 carries a loose sprocket wheel 31 and this is connected by a sprocket chain 32 to a large sprocket wheel 33 on a side of the bull wheel 2. The sprocket wheel 31 is releasably connected to the shaft 25 by a shiftable clutch member 34 the movements of which are controlled by a lever 35. It is thus evident that the clutch 21—22 may be released to stop a driving of the worm 23 and a consequent driving of the counter shaft 25 and that the clutch 34 may be released from the sprocket wheel 31 to permit a free turning of the bull wheel. The forward end of the motor shaft 20 is provided with a pulley 36 to enable the motor to be belted to any device to be driven thereby when it is desired to use the tractor in the manner of a stationary engine. When the tractor is so used, the clutch 21—22 is released.

The tractor frame at its rear end is provided with a cross-bar 37, which preferably extends at its ends beyond the sides of the frame to enable one or more plows or gangs of cultivator shovels or other soil working means to be attached thereto for vertical pivotal movements, such means being attached to the central portion, or to either end of the cross bar, or to all three portions thereof as may be desired for the nature of the work to be performed. In the present instance, a trailer frame 38 having a gang of cultivator plates 39 attached thereto is secured to the central portion of the cross-bar. The raising and lowering movements of the frame 38 are controlled by a lever 40, which is carried by the cross-bar 30 and has its lower end connected by a chain 41 to the arms of the frame 38.

In some cases, such for instance as when the tractor is operating on a hill side or is being used as a stationary power apparatus, it is desirable to provide means for bracing the tractor against lateral tipping movements. This is accomplished, in the present instance, by providing side supporting wheels 42 at the outer ends of a pair of cross bars 43, which have their inner ends adjustably projecting in opposite directions one over the other through guide members 44 mounted on the tops of the respective side bars of the frame 1. These bars are of angle-iron form to provide strength and also to adapt one to nest in the other, and they are secured in adjusted position by set-screws 45 projecting through the guides 44. If desired, either or both of these supporting wheels and bars may be entirely removed from the machine.

The guard apron or skirt 46 of the machine is of U-form with its looped portion disposed in advance of the caster-wheel 4 in guarding relation thereto and being of a form to adapt it to effect a dividing and lateral separating of the leaves or vines of plants which may have fallen over in the path of the machine. The leg portions of the apron extend rearwardly to the rear of the bull-wheel 2 at each side thereof and have their upper edges provided with lateral flanges 47 which are perforated to adapt them to be bolted to the lower edges or flanges of the side bars of the frame 1, said bars being preferably of channel-iron as shown in Fig. 5. The apron 46 extends from the frame 1 to near the ground line.

I wish it understood that my invention is not limited to any specific construction, arrangement or form of the parts as it is capable of numerous modifications and changes without departing from the spirit of the claims.

Having thus described my invention, what I claim as new and desire to secure by Letters Patent, is—

1. In a machine of the class described, a frame, a single bull-wheel disposed between the sides thereof, means on the frame for driving said bull-wheel, a caster-wheel supporting the forward end of said frame and having a steering arm projecting from its fork head longitudinally of the frame, control handles at the rear of said frame one of said handles being mounted for turning movements, and connection between the movable handle and said steering arm for communicating a turning movement to the latter from a turning of said handle.

2. In a machine of the class described, a frame, tractor means mounted within and carrying the frame, a caster wheel supporting the front end of the frame, a pair of control handles attached to and projecting from the rear end of the frame, and means connecting one of said handles and caster wheel operable to impart steering movements to the caster wheel from a movement of the handle relative to the frame.

3. In a machine of the class described, a frame, a single bull-wheel mounted therein and carrying the frame, a caster-wheel supporting the front end of the frame, a side supporting wheel carried by the frame, a control handle projecting rearwardly from the frame and rotatable relative thereto, and means connecting said handle and caster-wheel to impart steering movements to the caster-wheel from a turning of the handle.

4. In a machine of the class described, a frame, a bull-wheel carrying said frame, a caster-wheel supporting the forward end of said frame and having a circumferentially extending peripheral flange, a pair of control handles projecting rearwardly from said frame, one of said handles being mounted for turning movements at its axis, and means connecting said movable handle and caster-wheel to impart steering movements to the latter from a turning of the former.

5. In a machine of the class described, a frame, a bull-wheel mounted within and supporting said frame, a circumferentially flanged caster wheel supporting the forward end of the frame, manually controlled means mounted on the forward end of the frame for driving said bull-wheel and assisting by its weight to hold the flange of the caster wheel in the soil, a rotatable control handle projecting rearwardly from the frame, a shaft mounted vertically in the frame, and connections between the control handle and shaft and between the shaft and caster wheel to impart a steering movement to the wheel from a turning of the handle.

In testimony whereof I have hereunto signed my name to this specification.

LEROY JOSEPH WARNER.